United States Patent Office 3,093,656
Patented June 11, 1963

3,093,656
PYROMELLITDIIMIDES
John L. Dreher, Berkeley, and Judson E. Goodrich, San Rafael, Calif., assignors to California Research Corporation, San Francisco, Calif., a corporation of Delaware
No Drawing. Filed Feb. 21, 1961, Ser. No. 90,616
4 Claims. (Cl. 260—326)

This patent application is directed to new compounds useful as thickening agents for fluid compositions, and particularly useful as thickening agents for lubricating oils in the formation of high temperature stable grease compositions. Specifically, this patent application is directed to new imides; that is, to imides produced from amines and tetracarboxylic acids.

This application is a continuation-in-part of patent application Serial No. 29,179, filed May 16, 1960, U.S. Patent No. 3,025,241.

It is a primary object of this invention to provide new compounds which are useful for thickening fluid compositions.

Thus, in accordance with the present invention, the new compounds, tetraimides of dipyromellitic acid anhydride; have been discovered.

Not only do the particular tetraimides of dipyromellitic acid anhydrides thicken oils of lubricating viscosity to form grease compositions having high melting points, but the tetraimides of dipyromellitic acid anhydride are also useful for inks, creams, latex paints, varnishes, adhesives, etc.

The tetraimides of dipyromellitic acid anhydrides are illustrated by the following formula:

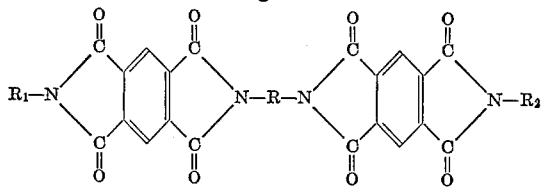

wherein R is a hydrocarbon radical selected from the group consisting of cyclic and acyclic, saturated and unsaturated hydrocarbon radicals containing from 1 to 30 carbon atoms, and $R_1$ and $R_2$ are hydrogen or cyclic and acyclic, saturated and unsaturated hydrocarbon radicals containing from 1 to 30 carbon atoms. The $R_1$ and $R_2$ radicals may or may not be identical.

The R radical can be exemplified by phenylene, diphenylene, ethylene, propylene, butylene, hexylene, heptylene, octylene, decylene, tetradecylene, octadecylene, etc.

$R_1$ and $R_2$ radicals can be exemplified by hydrogen, and the radicals: phenyl, p-tolyl, benzyl, hexyl, heptyl, octyl, decyl, dodecyl, tetradecyl, hexadecyl, octadecyl, etc.

When R, $R_1$ and $R_2$ radicals are derived from substituted mononuclear aromatic radicals, such as the toluidines and the phenylenediamines, it is preferred to use the para substituents rather than the ortho or meta in the preparation of thickening agents. Less thickening agent is necessary for the preparation of the desired grease, for example, by the use of the para derivative.

Tetraimides of pyromellitic acid dianhydrides of this invention are exemplified as follows: (N-hydrocarbyl-pyromellitdiimido-N'-hydrocarbylpyromellitdiimido) hydrocarbylenes, wherein the term "hydrocarbyl" refers to the hydrocarbon radicals $R_1$ and $R_2$ of the above formula, and the term "hydrocarbylene" refers to the hydrocarbon radical R of the above formula. Such tetraimides of pyromellitic acid dianhydrides include (N-arylpyromellitdiimido - N' - alkylpyromellitdiimido) arylene, such as (N-phenylpyromellitdiimido - N' - octadecylpyromellitdiimido) phenylene, such as, (N-p-tolylpyromellitdiimido-N-octadecyl) ethylene; (N-p-tolylpyromellitdiimido-N'-tolyl)-p-phenylene, etc.; (N-arylpyromellitdiimido-N'-alkylpyromellitdiimido) alkylene, bis - (arylpyromellitdiimido) arylene; such as bis-(N-phenylpyromellitdiimido) phenylene; bis-(N-arylpyromellitdiimido) alkylene, such as, bis - (N - phenylpyromellitdiimido) ethylene; bis-(N-alkylpyromellitdiimo) arylene, such as, bis-(N-octadecylpyromellitdiimido) phenylene; bis-(N-alkylpyromellitdiimido) alkylene, such as, bis-(N-octadecylpyromellitdiimido) ethylene; etc.

A method of preparing these polyimides of dipyromellitic acid anhydrides is illustrated as follows: 2 mols of pyromellitic acid dianhydride are reacted with 1 mol of a diamine at room temperatures, and including temperatures ranging from 100° F. to 500° F. and higher, preferably from 300° F. to 400° F. To the resulting diimide there is added, per mol of pyromellitic acid dianhydride, 1 mol of a monoamine, which mixture is then heated to temperatures of 300° F. to 500° F. or higher.

Another method of preparing the imides of this invention involves the heating of the desired amines and the pyromellitic acid dianhydrides in proper molal proportions as a mixture of all components and heating to 300° F. to 500° F.

It is preferred to dissolve or form a slurry of the amines in a solvent, which solution, or slurry, can then be added to a lubricating oil slurry of pyromellitic acid anhydride. Solvents which can be used include ethanol, acetone, tetralin, methyl ethyl ketone, etc., or they can be reacted in an oil of lubricating viscosity to form a lubricating oil concentrate thereof. For certain particular results, it may be desirable to purify the resulting imides, or they can be used as mixtures in the formation of grease compositions.

The examples set forth hereinbelow exemplify the preparation of the pyromellitic acid anhydride imides which are the grease thickening agents described herein.

The tetraimides of dipyromellitic acid dianhydrides described herein are new compounds.

EXAMPLE I

A slurry of 23.3 grams (0.1066 mol) of pyromellitic dianhydride in 50 ml. of hot methyl ethyl ketone was added to 180 grams Hercoflex 600, which is pentaerythritol tetracaproate sold as Hercoflex 600 by Hercules Chemical Company, in a Waring Blendor and stirred at room temperature of about 150° F. A solution of 4,4'-methylenedianiline (10.6 grams, 0.0533 mol) in 25 ml. of warm methyl ethyl ketone was added to the Waring Blendor, and the whole mixture was agitated further. The custard-like product was transferred to a beaker, and 5.7 grams (0.0533 mol) of p-toluidine, and 14.5 grams (.0525 mol) of Armeen 18D (octadecyl amine sold by the Armour Chemical Company) in 25 ml. warm methyl ethyl ketone was added with mechanical stirring. The mixture was heated during a period of 0.5 hour to a temperature of 400° F., followed by pan cooling. The cooled mixture was milled at 5,000 p.s.i. through an extrusion mill. The resulting grease had an unworked ASTM penetration of 231 ($P_0$=231) and an ASTM worked penetration of 295 ($P_{60}$=295). The oil separation after 30 hours at 350° F. was 5.79% and 5.22% on two separate samples. The bearing life at 350° F. was 356 hours (average of 3 runs).

Example II hereinbelow illustrates the two-step method by which the grease compositions exemplified herein may be prepared.

EXAMPLE II

A slurry of 23.3 grams of pyromellitic dianhydride was added to 180 grams of Hercoflex 600 in a Waring Blendor and stirred. A solution of 10.6 grams of 4,4'-methylenedianiline in 25 ml. of hot MEK was added and stirred. The resulting product was transferred to a beaker and heated with agitation to 370° F. The product at this point was fluid. This product was cooled to 150° F., at which temperature there was added 5.7 grams of p-toluidine and 14.5 grams of Armeen 18D in 30 ml. of hot MEK. The resulting mixture was heated to 400° F. This product was pan cooled and milled at 5,000 p.s.i. through an extrusion mill. The resulting grease had an ASTM unworked penetration of 268 and a worked penetration at 60 strokes of 344.

EXAMPLE III

A mixture of 760 grams (7.10 mols) of p-toluidine and 1,745 grams (6.32 mols) of Armeen 18D was heated to form a melt, after which there was added to the melt 698 grams (6.46 mols) of paraphenylenediamine and approximately 1,000 grams of Hercoflex 600. This fluid blend was then added to a grease kettle containing a mixture of 11,605 grams of Hercoflex 600, 2,820 grams (12.92 mols) of pyromellitic dianhydride in 1500 ml. of MEK which had been blended and agitated at room temperature. The whole mixture was heated to 180° F. at which temperature recycling of the mixture through a gear pump was begun. The whole mixture was then heated to 300° F., at which temperature there was added oxidation inhibitors. The mixture was heated to 400° F., then recycled through a Manton Gaulin homogenizer at 4,000 p.s.i. While the mixture was cooling, there was added approximately 10,605 grams of Hercoflex 600. The resulting grease composition was drawn from the kettle at 120° F. through a 120 mesh filter. The ASTM unworked penetration was 227. The worked penetration values were: $P_{60}$—280, and $P_{100,000}$—334.

The final grease composition contained 18.4% of the polyimide of the pyromellitic acid dianhydride.

EXAMPLE IV.—ISOLATION OF BIS(N-OCTADECYLPYROMELLITDIIMIDE)-P-PHENYLENE

A grease was prepared as in the examples hereinabove from 21.5 grams of pyromellitic acid dianhydride, 5.3 grams of p-phenylenediamine, 26.7 grams of Armeen 18D, 50 ml. of methyl, ethyl ketone, and 500 ml. of a California base oil having a viscosity of 480 SSU at 100° F.

The resulting thickened composition was diluted with hexane and filtered, recovering the thickening agent therefrom as a precipitate. The precipitate was washed with (1) boiling toluene, (2) boiling acetone, (3) 0.1 N aqueous NaOH, (4) boiling water, (5) boiling acetone, and (6) boiling toluene, then dried.

On analysis, it was determined that the resulting product contained:

| | Wt. percent |
|---|---|
| Carbon | 68.35 |
| Hydrogen | 5.39 |
| Nitrogen | 6.95 |
| Oxygen | 19.31 |

EXAMPLE V.—ISOLATION OF BIS(N-p-TOLYLPYROMELLITDIIMIDO)-p-PHENYLENE

A grease was prepared as in the examples hereinabove from 31.8 grams of pyromellitic acid dianhydride, 7.9 grams of p-phenylene diamine, 15.6 grams of p-toluidine, 500 ml. of a California base oil having a viscosity of 480 SSU at 100° F., and 50 ml. of methyl, ethyl ketone.

The resulting thickened composition was washed and treated as in Example IV hereinabove. On analysis, it was determined that the final product contained:

| | Wt. percent |
|---|---|
| Carbon | 65.28 |
| Hydrogen | 3.17 |
| Nitrogen | 9.63 |
| Oxygen | 21.92 |

EXAMPLE VI

A grease thickened with the compound, p-(N-p'-tolylpyromellitdiimido-N' - octadecylpyromellitdiimido) benzene, was prepared according to Example I hereinabove. The tetraimide was removed from the grease composition by solvent wash as described hereinabove to remove all the oils therefrom, and the neutral compound separated from the basic salt washes was isolated and analyzed as follows:

| | Percent | |
|---|---|---|
| | Found | Theory |
| C | 70.6 | 72.2 |
| H | 6.4 | 6.1 |
| N | 6.8 | 6.6 |
| O* | 15.4 | 15.1 |
| Ash | 0.8 | |
| | 100.0 | 100.0 |

*By difference.

When used as grease thickening agents, the tetraimides of pyromellitic acid dianhydrides herein are dispersed in the lubricating oils in amounts sufficient to thicken the oils to the consistency of greases. Such amounts include from 5% to 40%, by weight, more preferably from 15% to 25%, by weight.

Lubricating oils which can be used as base oils for the grease compositions described herein include a wide variety of lubricating oils, such as naphthenic base, paraffin base, and mixed base lubricating oils, other hydrocarbon lubricants, e.g., lubricating oils derived from coal products, and synthetic oils, e.g., alkylene polymers (such as polymers of propylene, butylene, etc., and the mixtures thereof), alkylene oxide-type polymers (e.g., alkylene oxide polymers prepared by polymerizing the alkylene oxide, e.g., propylene oxide, etc., in the presence of water or alcohols, e.g., ethyl alcohol), carboxylic acid esters (e.g., those which are prepared by esterifying such carboxylic acids as adipic acid, azelaic acid, suberic acid, sebacic acid, alkenyl succinic acid, fumaric acid, maleic acid, hexanoic acid, etc., with alcohols, such as butyl alcohol, hexyl alcohol, 2-ethylhexyl alcohol, dodecyl alcohol, pentaerythritol, etc.). Liquid esters of acid of phosphorus, alkyl benzenes, polyphenyls (e.g. biphenyls and terphenyls), alkyl biphenyl ethers, polymers of silicon (e.g., tetraethyl silicate, tetraisopropylsilicate, tetra(4-methyl-2-tetraethyl) silicate, hexyl (4-methyl-2-pentoxy) disiloxane, poly(methyl)siloxane, and poly(methylphenyl) siloxane. etc.

The above base oils may be used individually or in combinations thereof, wherever made miscible or wherever made so by use of mutual solvents.

Table I hereinbelow sets forth test data obtained by grease compositions thickened with polyimides of dipyromellitic acid dianhydrides described hereinabove. The R, $R_1$ and $R_2$ of the table identify the radicals of the formula set forth hereinabove.

Base Oil A was a California paraffinic base oil having a viscosity of 480 SSU at 100° F.

Base Oil B was a polymethylphenylsiloxane wherein the methylphenyl ratio had a value of about 0.4. This base oil is further identified at DC 550, which is sold as such by the Dow Corning Corporation, Midland, Michigan.

Base Oil C was Hercoflex 600, that is, pentaerythritol tetracaproate, sold by Hercules Powder Company.

Base Oil D was Emery 907-S, further identified as tridecyl azelate, sold by Emery Industries, Inc., Cincinnati, Ohio.

The "thin film test" measured the ability of the grease composition to maintain grease-like characteristics, particularly, the retention of pliability and resistance to oxidation under exposure of a thin film of grease to high temperatures. This test also indicated other grease characteristics, such as tendency to bleed, flake, and become tacky. The thin film test was run as follows: The grease to be tested was coated on a metal strip, the grease coating being of uniform dimensions: 1/32" thick, 7/8" wide and 2½" long. This grease sample was placed in an oven at 350° F. and observed at periodic intervals until the sample no longer existed as a grease. The "life" of the grease was the number of hours during which the grease could be so heated before it lost its grease-like characteristics, that is, the time at which the test sample became hard and brittle.

The "Bearing Life" for a particular grease composition was determined by the following test procedure which is known as the Navy High Speed Bearing Test as described in Federal Test Method 331.1. In this test, a ball bearing was operated at 10,000 r.p.m. continuously for approximately 22 hours at the temperature noted in the table. The apparatus was then cooled to room temperature during a period of 2 hours. This procedure of operation at 10,000 r.p.m. at the noted temperature and cooling was repeated until there was bearing failure.

The oil separation test was run by the procedure described in the FED-STD-791 Method No. 321. In this test 10 g. of grease was weighed into a wire gauze cone. The cone was suspended over a tarred beaker and placed in an oven at 350° F. for 30 hours. The beaker was cooled and weighed to determine the amount of oil which had separated.

having a viscosity of 150 SSU at 100° F. with p-(N-p-tolylpyromellitdiimido N'-octadecyl-pyromellitiimidediimido) benzene. When this base oil was hydrogenated, then thickened with the same tetraimide of dipyromellitic acid dianhydride, the resulting grease had a "Bearing Life" of 2200 hours (average of 3 tests).

When the tetraimides of dipyromellitic acid dianhydride are used as thickening agents in paint formulations, it is necessary to use smaller amounts than set forth hereinabove for greases. For example, paint compositions were prepared from 0.2% by weight and 0.8% by weight of p-(N-p-tolylpyromellitdiimido - N'- octadecylpyromellitdiimido) benzene.

We claim:

1. The compound of the formula

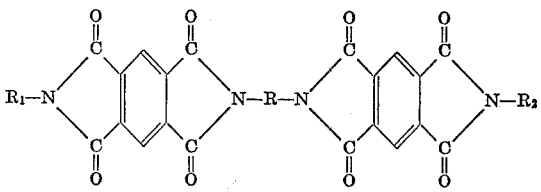

wherein R is a member selected from the group consisting of ethylene, propylene and phenylene, and $R_1$ and $R_2$ are members selected from the group consisting of hydrogen,

*Table 1*

| $R_1$, R and $R_2$ radicals derived from— | | | Base oil | Amt. of thickener (weight percent) | Other additives (weight percent) | ASTM penetration | | Dropping point, °F. | Thin film life 300° F. (hours) | Bearing life temp. | Hrs. |
|---|---|---|---|---|---|---|---|---|---|---|---|
| $R_1$ | R | $R_2$ | | | | $P_0$ | $P_{60}$ | | | | |
| (5) | p-Phenylenediamine | (5) | A | 24.0 | 0 | 308 | 415 | 580+ | | | |
| (4) | do | (4) | A | 16.0 | 1 5 | 239 | 269 | | | 350 | 2 216 |
| (5) | do | (4) | B | 25.0 | 0 | 251 | 303 | | | 450 | 3 124 |
| (5) | do | (5) | B | 24.0 | 0 | 316 | 341 | | | 450 | 3 115 |
| (5) | do | (5) | C | 22.8 | 1 4.2 | 265 | 303 | 580+ | 140 | 350 | 2 216 |
| (5) | do | (4) | C | 19.7 | 0 | 267 | 290 | 580+ | 88 | 350 | 3 48 |
| (5) | Ethylenediamine | (4) | C | 21.7 | 0 | 358 | 509+ | 580+ | | | |
| (5) | Diethylenetriamine | (4) | C | 20.6 | 1 5.0 | 437 | 509+ | | | | |
| (5) | Benzoquanamine | (4) | C | 20.6 | 1 5.0 | 401 | 509+ | | | | |
| (5) | Hydrazine | (4) | C | 20.6 | 1 5.0 | 312 | 405 | | | | |
| (5) | Benzidine | (4) | C | 20.6 | 1 5.0 | 302 | 342 | | | | |
| (5) | Methylenedianiline | (4) | C | 20.6 | 1 5.0 | 231 | 205 | 580+ | | 350 | 2 356 |
| (5) | p-Phenylenediamine | (4) | C | 17.6 | 1 1.9 | 261 | 296 | 580+ | 3 277 | 350 | 3 692 |
| (5) | do | (4) | D | 17.6 | 1 2.0 | 263 | 303 | | 281 | 350 | 3 433 |
| (5) | do | (5) | C | 22.8 | 1 4.2 | 265 | 303 | 580+ | 140 | 350 | 2 216 |

[1] An oxidation inhibitor. [2] Average of 3 tests. [3] Average of 2 tests. [4] Octadecylamine. [5] p-Toluidine.

*Table II*

| $R_1$ derived from | R derived from | $R_2$ derived from | Base oil | Amt. of thickener (weight percent) | Other additives (weight percent) | ASTM penetration | | Dropping point, °F. |
|---|---|---|---|---|---|---|---|---|
| | | | | | | $P_0$ | $P_{60}$ | |
| (6) | p-Phenylene-diamine | (6) | C | 17.0 | 1 5.0 | 280 | 311 | 580+ |
| (5) | do | (6) | C | 20.6 | 1 5.0 | 253 | 290 | 580+ |
| (5) | o-Phenylene-diamine | (6) | C | 20.6 | 1 5.0 | 338 | 509+ | 500 |
| (5) | M-Phenylene-diamine | (6) | C | 20.6 | 1 5.0 | 278 | 342 | 580+ |
| (5) | o-Tolidine | (6) | C | 20.6 | 1 5.0 | 279 | 323 | |
| (5) | p-phenylene-diamine | (8) | C | 20.6 | 1 5.0 | 273 | 316 | |
| (7) | do | (6) | C | 20.6 | 1 5.0 | 234 | 285 | |
| (2) | do | (2) | C | 20.6 | 1 2.0 | 290 | 362 | 580+ |
| (4) | Methylene-dianiline | (6) | C | 20.6 | 1 2.0 | 244 | 326 | |
| (4) | 2, 6-diamino-pyridine | (6) | C | 20.6 | 1 2.0 | 258 | 346 | 580+ |
| (5) | p, p'-Sulfonyl-dianiline (4, 4'-diaminodiphenyl sulfone). | (6) | C | 20.6 | 1 2.0 | 239 | 315 | |
| (5) | Methylene-dianiline | (3) | C | 20.6 | 1 2.0 | 399 | 509+ | |

[1] An oxidation inhibitor. [2] Alkylaniline (alkyl radical containing 12 carbon atoms). [3] Rosin Amine D—Hercules Powder Co. [4] Aniline [5] p-Toluidine. [6] Octadecylamine. [7] Benzylamine. [8] Dodecylamine.

The tetraimides of dipyromellitic acid dianhydrides described herein are particularly effective as thickening agents for hydrofined oils, that is, mineral oils that have been hydrogenated. For example, a "Bearing Life" (250° F.) of 400 hours (average of 3 tests) was obtained with a grease prepared by thickening a California base oil benzene, alkylbenzene having from 6 to 20 carbon atoms, and alkyl having from 6 to 22 carbon atoms.

2. The compound, (N-p-tolyl pyromellitdiimido - N'- octadecyl)p-phenylene.

3. The compound, (N-p-tolyl pyromellitdiimido - N'- octadecyl) ethylene.

4. The compound, (N-p-tolyl pyromellitdiimido-N'-tolyl)p-phenylene.

References Cited in the file of this patent

UNITED STATES PATENTS

| | | |
|---|---|---|
| 2,421,024 | Frosch | May 27, 1947 |
| 2,502,576 | Lincoln et al. | Apr. 4, 1950 |
| 2,710,853 | Edwards et al. | June 14, 1955 |

OTHER REFERENCES

Bergmann: The Chem. of Acetylene and Related Compounds, page 80 (1948).